Sept. 23, 1941.  W. GRAVES  2,256,739
MACHINE FOR SELECTIVELY PROJECTING CINEMA FILM RECORDS
Filed Sept. 29, 1938  3 Sheets-Sheet 2

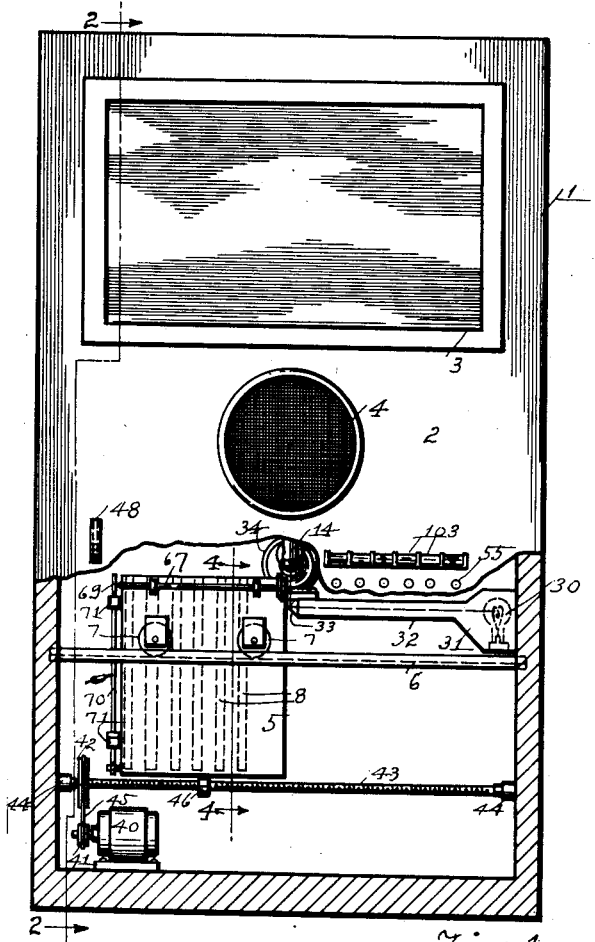

Witness:
John S Braddock

INVENTOR.
Weston Graves
BY Rice and Rice
ATTORNEYS.

Sept. 23, 1941.  W. GRAVES  2,256,739
MACHINE FOR SELECTIVELY PROJECTING CINEMA FILM RECORDS
Filed Sept. 29, 1938   3 Sheets-Sheet 3

Witness:
John S. Braddock

INVENTOR.
Weston Graves
BY Rice and Rice
ATTORNEYS.

Patented Sept. 23, 1941

2,256,739

UNITED STATES PATENT OFFICE 2,256,739

MACHINE FOR SELECTIVELY PROJECTING CINEMA FILM RECORDS

Weston Graves, Flint, Mich., assignor of one-half to Nelson Graves, Flint, Mich.

Application September 29, 1938, Serial No. 232,253

9 Claims. (Cl. 88—17)

The present invention relates to machines or apparatus for selectively projecting cinema film records; and its object is, generally, to provide an improved machine of this character whereby such records, particularly records of continuous or belt form, may be selectively projected for reproducing their visible and audible features; and, more particularly, to provide containers for housing and protecting the respective records while being stored and also while being projected; and further, to provide a carriage for moving the records and their containers selectively to positions wherein they are projected by common means, on which carriage a desired number of the containers may be disposed in any desired order or sequence and to or from which carriage the containers with the records therein may be readily transferred for projection or storage and without the necessity of connecting or disconnecting the records and the means for operatively travelling them through the field of the projecting means; and further, to provide such containers with means mounted thereon for engaging and travelling the records; and further, to provide means mounted on the body of the machine for selectively actuating said record-travelling means; and further, to provide improved means, mechanical and electrical, for so doing including coin controlled means for initiating the operation thereof.

These and any other and more specific objects hereinafter appearing are attained by, and the invention finds preferable embodiment in, the illustrative machine or apparatus and the mechanical and electrical devices thereof particularly described in the body of this specification and illustrated by the accompanying drawings, in which:

Figure 1 is an elevational front view of a machine or apparatus for selectively projecting cinema film records, shown partially in vertical section taken on line 1—1 of Figure 2;

Figure 2 is a vertical sectional view thereof taken on line 2—2 of Figure 1;

Figure 3 is a fragmentary view in perspective (enlarged) of parts of the same;

Figure 8 is a detail view in perspective of an upper corner portion of the carriage showing a portion of an electric switch pivotally mounted thereon;

Figure 9 is a detail view of a portion of another electric switch.

Figure 4:
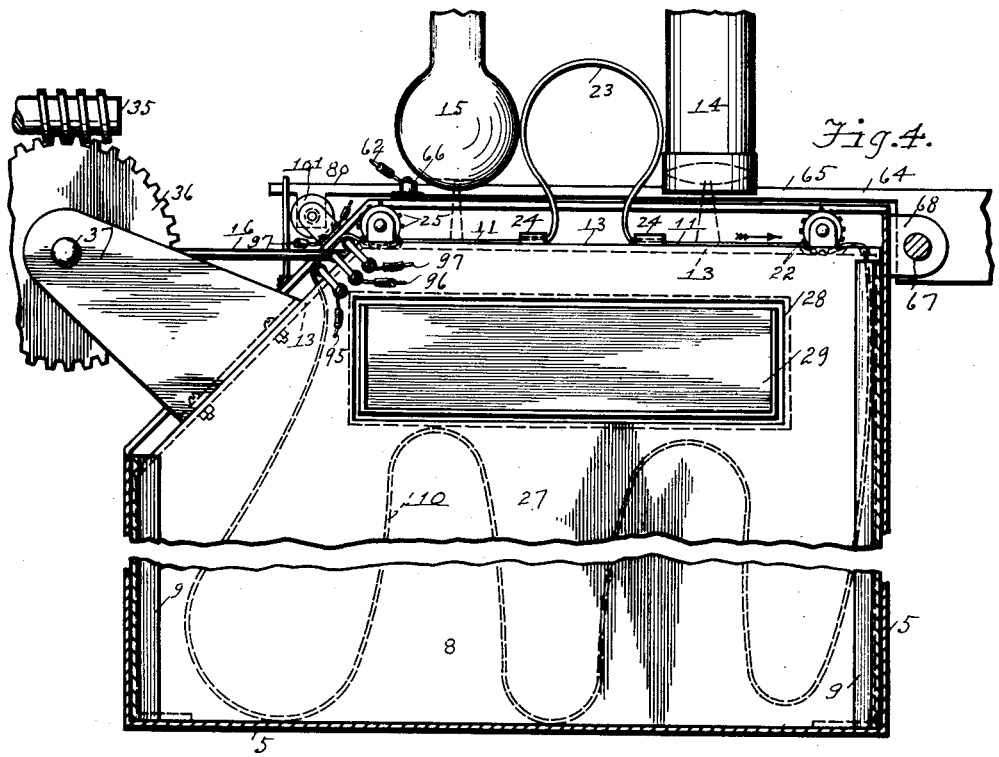
Figure 4 is an elevational endwise view (enlarged) of the machine's magazine or carriage for the containers or mounts of the records to be projected or reproduced and of one of said containers, with connected and adjacent parts, shown partially in transverse vertical section taken on line 4—4 of Figures 1 and 5.

In the embodiment of the invention illustrated by these drawings my apparatus for selectively projecting cinema film records is shown housed in a suitable cabinet 1 having in its front wall 2 screened openings 3 and 4 through which the visible and the audible features respectively of the records are projected simultaneously. A magazine or carriage 5 for containers of the records, open at its top, has a reciprocating horizontal movement on a way comprising a pair of tracks 6 on which roll the wheels 7 journalled on the front and rear sides of the carriage.

Figure 5:
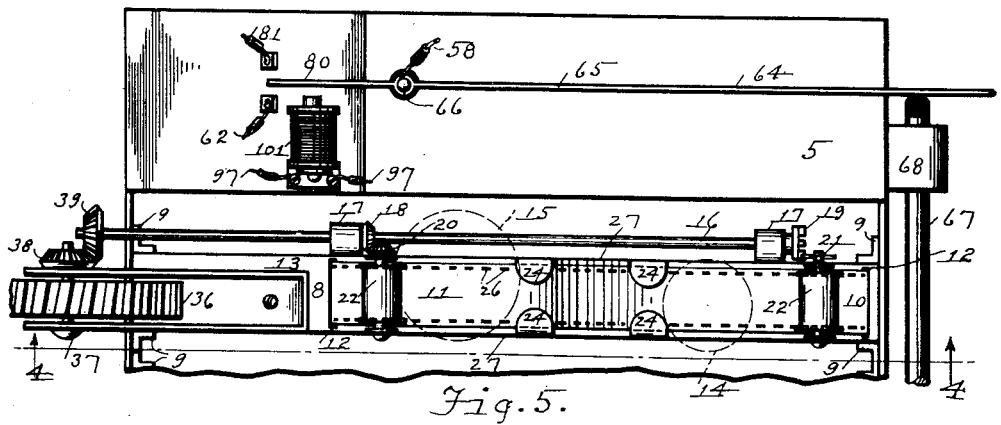
Figure 5 is a top plan view of portions thereof.

In this carriage a desired plurality (six in the illustrated construction) of flat, narrow box like containers or mounts 8 are removably disposed side of side between vertical ribs 9, each container holding one of said records—a cinema film 10—of continuous or belt form, a portion 11 of which extends through spaced openings or slots 12 in the container's upper wall 13 and is slid therealong, as best seen in Figures 4 and 5.

The visible and audible features of the records are simultaneously projected by well known methods and means, parts of such means respectively, located above the magazine, are indicated at 14 and 15. The record film in its container is travelled circuitously by the rotation of the shaft 16 journalled at 17 on the container and having as indicated in Figure 5 means 18, 19 meshing with means 20, 21 on the spaced rolls 22, also journalled on the container, for moving the record continuously through the field of the part 15 of the sound-projecting means and intermittently through the field of the part 14 of the sight-projecting means, the record between said fields being looped upwardly at 23 between spaced guides 24, and the rolls having the usual sprocket arms 25 engaging in holes 26 of the record for traveling the same.

The forward end (the right hand end in Figure 1) of the carriage and the side walls 27 of the containers have aligned openings 28, 29 therethrough. The electric lamp 30 of one part of the sight-projecting means has a casing 31 with a horizontal arm or hollow extension 32 projecting toward the forward end of the carriage and having at its open outer end a prism 33 whereby the light shed by the lamp through said extension is deflected upwardly through the film record to the part 14 of the projector for the record's visible features. As the carriage is moved forwardly (toward the right hand side of Figure 1) as hereinafter explained, the outer end of this extension 32 enters the opening 28 in the carriage, the openings 29 in the containers forwardly of that container which holds the record selected for projection and also the opening 29 in the forward side wall of the selected record's container, so that the prism is brought into position for projecting this selected record.

The shaft 16 is rotated for traveling the film record by an electric motor 34 whose shaft has a worm portion 35 meshing with the worm wheel 36 journalled at 37 on the container, this worm wheel's shaft having a bevel gear 38 meshing with the bevel gear 39 on the shaft 16.

The worm wheels of all the containers in the magazine are identical, in axial alignment, and properly spaced apart so that the worm wheel of only that particular container which holds the selected record may, by the movement of the carriage, be moved sidewise into mesh with the worm 35. The carriage is moved, on the tracks 6 and under the parts 14, 15 of the projecting means, to a stopped position wherein the selected record is in registration with said parts, by the reversible electric motor 40 the sheave 41 of whose shaft and the sheave 42 of the threaded shaft 43 journalled at 44 below the carriage carry a driving belt 45, the carriage having on its under side an internally threaded lug or nut 46 in which this shaft turns.

The operation of the machine may be, and in the illustrated construction is, initiated by depositing a coin 47 in the mouth 48 of a downwardly-extending chute 49. The weight of this coin falling into a shallow depression 50 in the spring arm 51 of an initially open electric switch depresses it into contact with the fixed lower arm 52 of said switch to close the electric circuit containing the motor 40.

For selectively operating the machine, a plurality of selecting levers 53, one for each record container in the carriage, are fulcrumed at 54 side by side, the horizontal end portions 55 of their upper arms 56 extending through a row of openings in the front wall of the cabinet.

Figure 6:
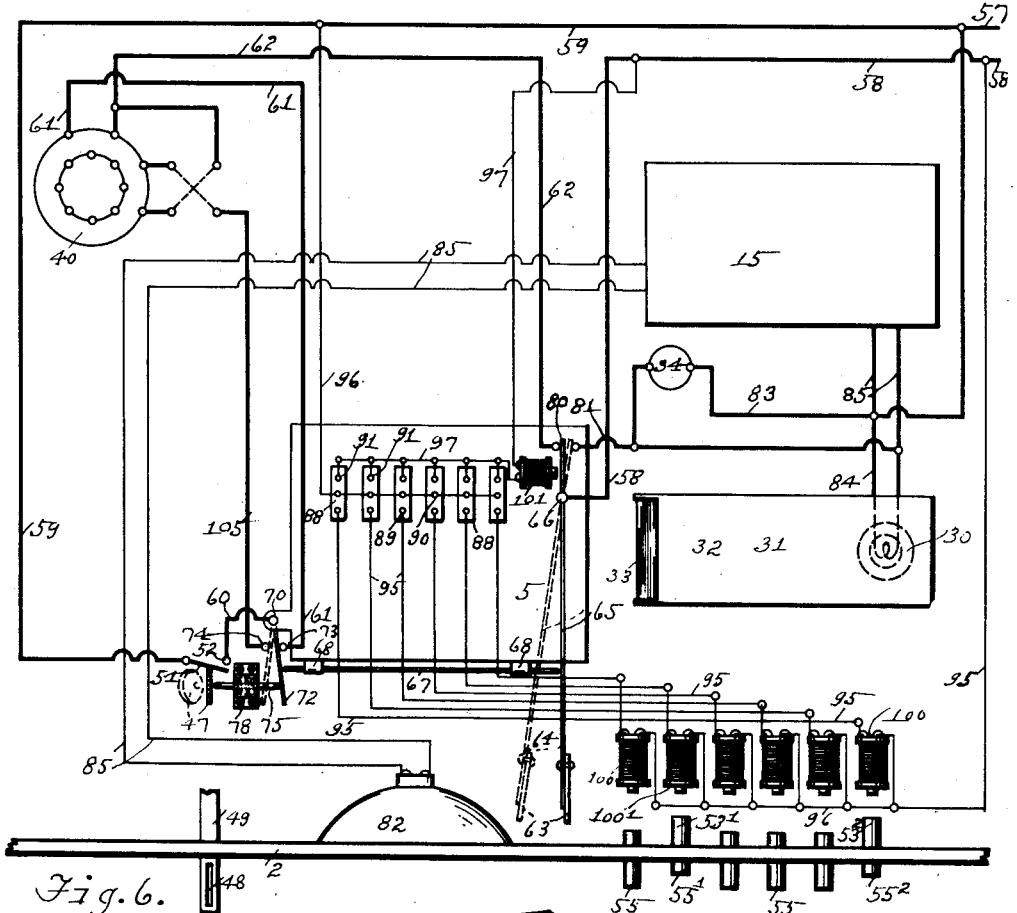
Figure 6 is a diagrammatic top plan view of mechanical and electrical devices with their electrical connections, whereby the machine is operated.

The machine or apparatus and its aforesaid and its hereinafter described mechanical and electrical devices, indicated in initial positions in Figure 6, are operated in proper sequence and in the following manner. The upper end portion of the lever which corresponds with the selected record (as the end portion 55[1] of lever 53[1]) is manually pressed inwardly to the position shown in Figure 6 and the coin is deposited in the chute for closing the main electric circuit which contains the motor 40 and a suitable source of electric energy and comprises the main wires 57, 58 and connecting wires 59, 60, 61, 62.

An electric switch in said main circuit (best shown in Figures 3 and 8) has a vertical spindle portion 70 connected with wire 60 and turnably mounted at 71 on the carriage, this spindle portion having a radial switch arm 72. In this switch's initially turned position, its arm 72 contacts the switch's fixed arm 73 connected with wire 61 thus closing the main circuit at this point.

When this circuit is closed by depositing the coin in the chute, the motor 40 thus energized moves the carriage from its initial position shown in Figure 1 toward the right hand side of that view until the end portion 63 of the long arm 64 of the lever switch 65 pivoted at 66 on the carriage strikes the upper arm of said selecting lever 53[1] which has been manually pressed into the path of said end portion 63.

This switch 65 is thus turned (by the movement of the carriage) to the broken line position in Figure 6 to open said main circuit between the wires 62, 58 for deenergizing the motor 40 and stopping the magazine in the position wherein the container of the selected record registers with the parts 14, 15 of the projecting means and with the prism 33 at the end of extension 32 which has been entered into the carriage and container by the carriage's movement. By this movement of the carriage the worm wheel 36 of said container is brought into mesh with the worm portion 35 of the shaft of motor 34.

The said movement of switch 65 (caused by striking the upper arm of said selecting lever 53[1]) closes, by this switch's short arm 80, the main branch circuit comprising the wires 58, 81, this main branch circuit having portions or branches, 83 containing the motor 34, 84 containing the lamp 30 and 85 containing the part 15 of the sound-projecting means and the amplifying part 82 of said means. This motor 34, thus energized, travels the selected film record while the lamp and said projecting means reproduce or project its visible and audible features.

And the said movement of switch 65 also causes its long arm 64 to turn rearwardly and strike the forward end of a horizontal rod 67 slidable at 68 on the carriage and slide it rearwardly thus causing the rear end of this rod to engage the radial wing 69 of said spindle portion 70 and turn the same for moving the radial arm 72 of the switch shown in Figure 3 to its broken line position shown in Figure 6 in which position this arm 72 is moved out of contact with the fixed arm 73 of said switch and into contact with this switch's other fixed arm 74 connected by wire 105 with the motor 40 for reversing this motor when the main circuit is again completely closed, all as hereinafter explained.

Figure 7:
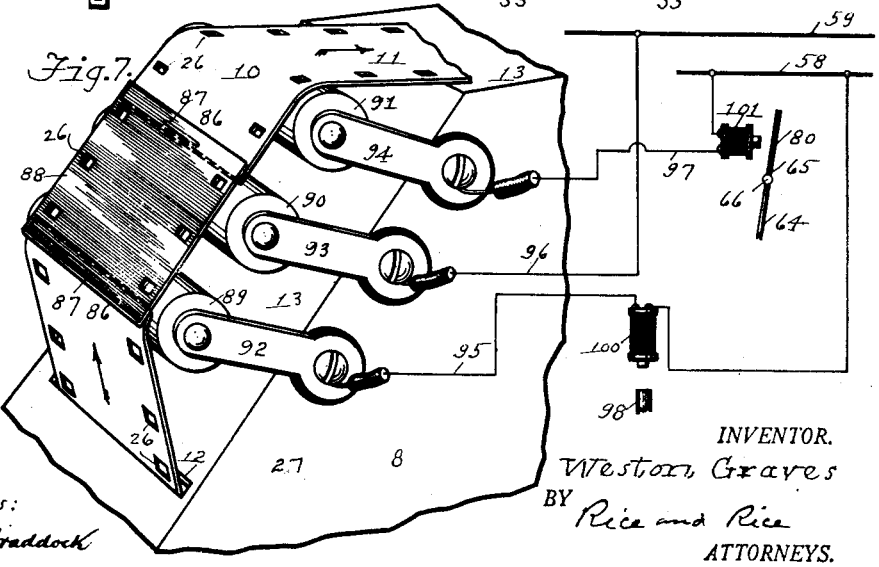
Figure 7 is a view in perspective (enlarged) of a portion of one of the containers with some of said devices and connections, shown somewhat diagrammatically.

The circuitous belt film record 10 is interrupted as shown in Figure 7 and its ends 86 are connected by suitable clips 87 with a flexible conductor sheet 88. As the record travelled by motor 34 nears the end of the projection thereof, this sheet 88, extending over and contacting the conductor rolls 89, 90 turnable on supporting conductor arms 92, 93 mounted on the container as shown in Figure 7, closes the circuit branching from main wires 57, 58 and comprising wires 95, 96 connected with said arms 92, 93 respectively.

The magnet 100 in this branching circuit being thus energized attracts the armature lower (short) arm 98 (see Figure 2) of the corresponding selecting lever (lever 53[1]) and returns this lever to initial position; and as the continued travel of the record carries said sheet 88 out of contact with the first roll 89 (thus opening circuit 95, 96) and into contact with both the second roll 90 and a like third roll 91 turnable on a similar arm 94, the circuit branching from the main wires and comprising wire 96 and the wire 97 connected with arm 94 is closed, so that the magnet 101 in circuit 96, 97 thus energized attracts the armature upper (short) arm 80 of the lever switch 65 and opens said main branch circuit between wires 58, 81 to deenergize the motor 34 and stop the traveling of the record and the projection thereof.

The main circuit being now completely closed (between the wires 62, 58 by the short arm 80 of lever 65 and having been as above explained already closed between the wires 60, 105 by the switch arm 72 in its broken line position seen in Figure 6), the motor 40 is energized to rotate the threaded shaft 43 reversely for returning the carriage to its initial position. As the carriage nears said initial position, it or some part carried thereby (as shown the switch arm 72 of the vertical spindle 70) engages the adjacent end of a rod 75 and slides it in its bearing 76 in a post 77 stationary on the floor of the cabinet so that this rod's other end engages the coin 47 and dislodges it from the spring arm 51 (see Figures 3 and 8) whereby the switch shown in Figure 3 is opened thus opening said main circuit, whereupon the spring 78 returns said rod 75 to its initial position. The parts of the machine are now left in their initial positions.

More than one of these selecting levers, as lever 53², may at one time be pressed inwardly to cause the successive projection of records corresponding therewith, a corresponding number of coins having been deposited in the chute, and said end portion 63 is made springable in one direction in order that it may spring over and past the upper arm of any inwardly pressed lever (as lever 53¹) as shown in Figure 9, without urging the same outwardly, and after another lever (as lever 53² having the end portion 55²) has been operatively engaged by said spring end portion 63 of lever 65, it being understood that the carriage is automatically returned to initial position after the projection of any record before it is moved forwardly again for projecting another selected record for which a coin has been deposited. Suitable clips for labels identfying the records are located at 103 on the cabinet's front, corresponding in positon with the upper end portions 55 of the selecting levers therefor.

An inclined mirror for projecting the visible features of the records horizontally is shown at 104. The coins fall into a box 79 in the cabinet when dislodged from the switch arm 51.

It will thus be seen that the film records are at all times housed and protected from injury each in its own boxlike container, and that these containers in any desired number with the records therein may be transferred to and from the carriage and arranged thereon in any desired order or sequence, all without operating or releasing any attaching means and without connecting or disconnecting the records and their travelling means, the containers being releasably held against horizontal displacement on the carriage merely by such devices as the vertical bars 9; and that the means for engaging and travelling the records (the sprocket arms 25) are carried by the containers themselves. The record-enclosing walls of the containers may, of course, be omitted if desired, retaining these sprockets and their driving means which are carried by the containers.

The invention being intended to be pointed out in the claims, is not to be limited to or by details of construction and arrangement of the particular embodiment thereof illustrated by the drawings or hereinbefore shown or described.

I claim:

1. In a machine of the class described for selectively projecting film records of belt form: projecting means; containers for the respective records held in the hereinafter mentioned carriage; a carriage for the containers having a movement for carrying the records into positions respectively in operative registration with said means; means for stopping the moving carriage in positions wherein the records respectively are in said registration; means carried by the containers respectively for operatively traveling the records therein through the field of the projecting means; means for actuating the respective record-traveling means including toothed axially aligned rotatable driven members on the containers respectively operatively connected with said record-traveling means thereof and a shaft journalled on the body of the machine having a threaded portion brought into mesh with said members by the movement of the carriage to positions wherein the records respectively are in said registration with the projecting means.

2. In a machine of the class described for selectively projecting film records of belt form: projecting means; containers for the respective records held in the hereinafter mentioned carriage; a carriage for the containers having a movement for carrying the records into positions respectively in operative registration with said means; means for stopping the moving carriage in positions wherein the records respectively are in said registration; means carried by the containers respectively for operatively traveling the records therein through the field of the projecting means; means for actuating the respective record-traveling means including toothed axially aligned rotatable driven members on the containers respectively operatively connected with said record-traveling means thereof and a shaft journalled on the body of the machine having a threaded free end portion brought into mesh with said members by the movement of the carriage to positions wherein the records respectively are in said registration with the projecting means.

3. In a machine of the class described for selectively projecting film records: projecting means; containers for the respective records held side by side in the hereinafter mentioned carriage; a carriage for the containers having a reversible movement in a direction transverse the sides of the containers for carrying the records into positions respectively in operative registration with said means; means for thus moving the carriage; means for stopping the moving carriage in positions wherein the records respectively are in said registration; means carried by the containers respectively for carrying and traveling the records therein through the field of the projecting means; manually operated selecting means corresponding with the containers respectively for operating the stopping means, the projecting means including parts at the opposite sides respectively of the selected record one of said parts being by the movement of the carriage entered into the interior of the container of the selected record in operative registration with the other part of the projecting means on said record's opposite side.

4. In a machine of the class described for selectively projecting film records; projecting means; containers for the respective records held side by side in the hereinafter mentioned carriage and having aligned openings through their sides; a carriage for the containers having a reversible movement in a direction transverse the sides of the containers for carrying the records into positions respectively in operative registration with said means; means for thus moving the carriage; means for stopping the moving carriage in positions wherein the records respectively are in said registration; means carried by the containers respectively for carrying and traveling the records therein through the field of the projecting means; manually operated selecting means corresponding with the containers respectively for operating the stopping means, the projecting means including parts at the opposite sides respectively of the selected record one of said parts being by the movement of the carriage inserted through the opening in the side of the container of the selected record to operative registration with the other part of the projecting means on said record's opposite side.

5. In a machine of the class described for selectively projecting film records: projecting means; containers for the respective records held in the hereinafter mentioned carriage; a carriage for the containers having a movement for carrying the records into positions respectively in operative registration with said means; means for stopping the moving carriage in positions wherein the records respectively are in said registration; means carried by the containers respectively for operatively traveling the records therein through the field of the projecting means; means for actuating the respective record-traveling means including a driven member on each container operatively connected with said record-traveling means thereof and a driving member on the body of the machine, said members having parts brought into mutual cooperative engagement by the movement of the carriage to a position wherein the record in said container is in said registration with the projecting means; and electrically energized means for moving the carriage and operating the aforesaid means in sequence, said electrically energized means including an electric circuit having spaced contacts and a conductor portion of the record movable by the travel thereof into and out of circuit-closing relation with said contacts.

6. In a machine of the class described for selectively projecting film records: projecting means; containers for the respective records freely removably held side by side in the hereinafter mentioned carriage; a carriage for the containers having a movement for carrying the containers and the records therein into positions respectively in operative registration with said means; means for operatively travelling the records through the field of the projecting means, the projecting means including parts at the opposite sides respectively of the selected record one of said parts being by the movement of the carriage entered into the interior of the container of the selected record in operative registration with the other part of the projecting means on said record's opposite side.

7. In a machine of the class described for selectively projecting film records through the field of a projecting means, a plurality of mounts for the respective records, each mount including means for individually moving its respective record through said field, an actuator common to said record moving means for selectively actuating the same, a reciprocable carriage for the mounts movable from a retracted position to operative selected positions of registry of the mounts with the field of the projecting means and vice versa, means for moving said carriage from its retracted position to selected positions of registry between the mounts and the field of the projecting means and vice versa, means for returning the carriage to its initial retracted position, and means disposed at opposite ends of the carriage, which together with the carriage walls form pockets embracing the bottom and sides of the mounts and from which the mounts are freely and individually removable, said means serving to hold the mounts against lateral displacement relative to the carriage.

8. In a machine of the class described for selectively projecting film records through the field of a projecting means, a plurality of mounts for the respective records, each mount including means for individually moving its respective record through said field, an actuator common to said record moving means for selectively actuating the same, a horizontally reciprocable carriage for the mounts movable from a retracted position to operative selected positions of registry of the mounts with the field of the projecting means and vice versa, said carriage having an open upper end and a plurality of spaced vertical guides disposed at opposite ends thereof between which the mounts are received and from between which the mounts are freely slidable and removable, said guides embracing the sides of the mounts and serving to hold the mounts against lateral displacement relative to the carriage.

9. In a machine of the class described for selectively projecting film records through the field of a projecting means, means operatively engaging the respective records for intermittently moving the same through said field, a plurality of mounts containing the respective records and said means for engaging and moving the same, a carriage for the mounts movable to and from selected positions of registry of the mounts with said field, means for thus moving the carriage, an actuator common to said record engaging and moving means for selectively actuating the same including a driving member on the frame of the machine brought directly into operative connection with said record engaging and moving means by the movement of the carriage to such selected positions of registry, each mount with its record and said engaging and moving means therefor being removable as a unit from the machine without disturbing the record or disengaging the same from its said engaging and moving means.

WESTON GRAVES.